Patented July 20, 1954

2,684,305

UNITED STATES PATENT OFFICE 2,684,305

PROCESS OF EFFECTING POLYMERIZATION

Quentin Leroy Quinlivan, Wilmington, Del., assignor to The Celastic Corporation, Wilmington, Del., a corporation of Delaware No Drawing. Continuation of application Serial No. 24,442, April 30, 1948. This application January 9, 1951, Serial No. 205,224

14 Claims. (Cl. 117—33)

This invention relates to a process of effecting polymerization and, more particularly, to the polymerization of the polymerizable compound of a sheet comprising a polymerizable ethylenically unsaturated organic compound. This application is a continuation of applicant's copending application Serial No. 24,442, filed April 30, 1948, and now abandoned.

Various products containing unreacted or unpolymerized components adapted to be polymerized in the form of sheets, are becoming increasingly important in the fabricating field. These products include fibrous sheets, either woven or felted, impregnated with polymerizable liquid monomers or monomer/polymer compositions, and sheets formed from monomer/polymer doughs. Usually, such sheets must be stored, cut, stamped, formed, and the like before polymerization of the unpolymerized component is desirable and the problem of keeping these sheets in the unpolymerized stage during these operations and then effecting polymerization thereof at the desired stage is a complex one not satisfactorily solved heretofore.

To effect the polymerization of the unpolymerized component of these sheets, the art has resorted to the expedient of incorporating, one way or another, polymerization catalysts in the polymerizable component thereof before or during compounding of the monomer/polymer composition or impregnating of a base material. The result of this practice is to insure polymerization at economical speeds but at the same time there is raised the necessity of constantly guarding against premature polymerization. It will be apparent that a great advantage would be gained if the polymerization catalyst required to effect the polymerization within feasible time cycles, did not need to be incorporated with the monomer at these early stages appreciably before polymerization of the monomer is desirable and yet, when polymerization was desired, it could still be carried out within acceptable time cycles.

An object of the present invention is to provide a novel method of bringing polymerization catalysts in contact with the monomer component of sheets comprising a liquid polymerizable monomer. A further object of the invention is to provide a novel process of adding polymerization catalysts to monomer-impregnated sheeting or monomer/polymer sheeting. A still further object is to provide an efficient and economical process for adding controlled amounts of polymerization catalysts to selected portions of sheets containing liquid polymerizable monomers. Other objects will be apparent from the description of the invention given hereinafter.

The above objects are accomplished according to the present invention by the step, in the process of polymerizing a liquid polymerizable ethylenically unsaturated organic compound distributed through a solid in the form of a sheet, the proportion of the liquid polymerizable compound and its distribution through the solid being such that a sheet substantially dry on its surface results and the liquid polymerizable compound being free of polymerization catalyst, of bringing a solid polymerization catalyst into intimate contact with the surface of the sheet only. In a preferred form, the invention is carried out by dissolving the solid polymerization catalyst in a volatile organic liquid, spraying or, preferably, brushing a solution on the surface of the sheet, evaporating the solvent therefrom whereby the catalyst is deposited on the surface only, and then subjecting the sheet to polymerization conditions such as light or heat.

The catalyst may be applied to the surface of the sheet in the form of a dry finely-divided powder by dusting. Further, where the sheet is to be laminated with another sheet, the catalyst may even be applied to that surface of the second sheet which is to be brought into contact with the first sheet.

It has been found that by bringing a solid catalyst merely into contact with the surface of a sheet having a liquid monomer distributed therethrough, the polymerization of the monomer throughout the sheet is, very unexpectedly, accelerated effectively. It is believed that the catalyst serves to initiate polymerization of polymer chains at the surface of the body and that the chains increase in length as the monomer units below the surface are activated. Moreover, the exothermic heat of polymerization tends to activate the monomer units within the body, thereby effecting polymerization below the surface. Whether or not this theoretical explanation is correct, the fact remains that sheets and other bodies comprising a polymerizable ethylenically unsaturated organic compound may be most efficiently and economically handled by applying a polymerization catalyst to the surface thereof at the time polymerization of the polymerizable component thereof is desired, a fact apparently not suspected heretofore in the art of addition polymerization.

The effect of the catalyst merely applied to the surface of the sheet is all the more surprising because the polymerization catalyst is a solid and the monomer distributed throughout the sheet is free of polymerization catalyst. Moreover, the sheet is substantially dry on its surface. Even when the catalyst is dissolved in a volatile solvent and applied to the surface of the sheet by brushing or spraying, the catalyst is still deposited on the surface of the sheet only as volatilization is so rapid. The value of this discovery will be readily apparent when it is realized that there is no practical way of distributing the catalyst throughout the sheet just prior to the time polymerization of the monomer is desired. Such distribution could be at least partially effected by using a non-volatile solvent but this expedient is not available practically because of the difficulty in getting rid of the solvent. Likewise, prolonged soaking of the sheet in a catalyst solution, even when a volatile solvent is used, is impractical as there is a tendency to affect adversely the distribution of monomer throughout the sheet as well as the fact that it is costly to have to remove solvent that has permeated throughout the sheet.

The following examples wherein all parts are given by weight unless otherwise indicated, illustrate specific embodiments of the invention.

Example I

The following ingredients were blended in a mixer and thereafter calendered into a substantially dry sheet:

| | Parts |
|---|---|
| A copolymer of vinyl chloride and vinyl acetate containing 90% of vinyl chloride | 1500 |
| Tetraethylene glycol dimethacrylate | 975 |
| Pulverized titanium dioxide | 650 |
| A copolymer of butadiene and acrylonitrile containing 60% of butadiene | 270 |
| Acetone | 850 |

A sample, ¾" wide and 4" long, cut from the sheet, was brushed with an acetone solution containing 7% of benzoyl peroxide so that 3% of benzoyl peroxide, based on the weight of tetraethylene glycol dimethacrylate, was deposited on the sheet upon evaporation of the acetone. This sample was subjected to heat from a direct field high-frequency heating unit and thereafter the stiffness was measured by using a modification of ASTM test D-747-44T, such modification comprising measuring the percent torque required to produce a deflection of 25° in a sample ¾" wide using a one-pound weight and a 2" span. A control sample, sample 2 in the table below, contained no catalyst.

The results are summarized in the table below, per cent of benzoyl peroxide being based on weight of tetraethylene glycol dimethacrylate.

| | Samples | |
|---|---|---|
| | 1 | 2 |
| Benzoyl peroxide in the original sheeting (percent) | 0 | 0 |
| Benzoyl peroxide added by brushing (percent) | 3.0 | 0 |
| Total benzoyl peroxide | 3.0 | 0 |
| Peak Stiffness | 60 | (¹) |
| Time in seconds required to reach peak stiffness | 4.5 | |
| Thickness of uncured sheeting (inches) | 0.035 | 0.035 |

¹ Did not stiffen.

Example II

A sheet of cotton fabric was impregnated with the following composition:

| | Parts |
|---|---|
| A copolymer of vinyl chloride and vinyl acetate containing 88% vinyl chloride | 100 |
| Polyethylene glycol 200 dimethacrylate | 100 |
| Acetone | 324 |

After drying at room temperature to remove the acetone, the substantially dry impregnated sheet, containing 70% plastic load based on the total weight of the sheet, was cut and shaped into a number of semi-cylindrical blanks around a cylindrical form, the blanks being sandwiched between two layers of cotton fabric. Each of the blanks was catalyzed by a different procedure before curing in a high-frequency heating unit. The method of catalyzing each of the blanks is described in the tabulation below:

Sample 1.—No catalyst used at all.

Sample 2.—Sprayed on both sides with an acetone solution containing 5% of benzoyl peroxide until 2% of benzoyl peroxide, based on the weight of the dimethacrylate, was deposited on the surface upon evaporation of the acetone.

Sample 3.—Sprayed on one side only with a solution containing 5% of benzoyl peroxide. 1% of benzoyl peroxide, based on the weight of the 200 dimethacrylate, was deposited.

Sample 4.—The face of an adjacent layer of fabric, intimately in contact with the blank, was sprayed with an acetone solution containing 5% of benzoyl peroxide so that 4% of catalyst, based upon the weight of the dimethacrylate in the blank, was precipitated thereon.

Sample 5.—An acetone solution containing 5% of benzoyl peroxide was sprayed on both adjacent layers of fabric, on the faces intimately in contact with the blank, so that 8% of catalyst, based on the weight of the dimethacrylate in the blank, was precipitated on the adjacent layers.

All of the blanks, catalyzed as noted above, were subjected to heat from a high-frequency heating unit for a period of thirteeen seconds. The polymerizable content of the blanks was completely polymerized after the exposure to high-frequency heat, and all of the blanks were equally stiff except sample 1 which contained no catalyst. Sample 1 did not stiffen after twenty seconds' exposure to high-frequency heat.

Example III

A sheet of cotton fabric was impregnated with a solution of the following formulation:

| | Parts |
|---|---|
| A copolymer of vinyl chloride and vinyl acetate containing 95% vinyl chloride | 50 |
| Monomeric divinyl adipate | 50 |
| Acetone | 115 |

After evolution of the solvent at room temperature, the substantially dry sheet was 0.040" in thickness. A rectangular sample of this sheeting was cut and thereafter shaped into a semi-cylindrical blank around a cylindrical form, the blank being sandwiched between two layers of cotton fabric. Before compositing the layers, an amount of lauroyl peroxide was dusted onto the surface of one of the layers of fabric adjacent the blank, so that 8% of lauroyl peroxide, based on the weight of divinyl adipate, was intimately in contact with one surface of the blank. The blank was thereafter stiffened by subjecting it to heat from a high-frequency heating unit for a period of sixteen seconds.

Example IV

A sheet of cotton fabric was impregnated with the following composition:

| | Parts |
|---|---|
| A copolymer of vinyl chloride and vinyl acetate containing 95% vinyl chloride | 154 |
| Triethylene glycol dimethacrylate | 154 |
| Benzoyl peroxide | 3 |
| Acetone | 500 |

After evolution of the solvent, the substantially dry sheet had a plastic load of approximately 70% based on the total weight of material. The thickness of the sheet was approximately 0.040". Onto one side of a sample of the sheet, 4" x 10", powdered benzoin was uniformly applied so that 3% of that photopolymerization catalyst, based upon the weight of triethylene glycol dimethacrylate, was deposited thereon. The sheet was then sealed between two sheets of transparent cellophane and the side on which the catalyst was applied, was placed uppermost ½" below a bank of four BL–360 lights (BL–360 fluorescent lights manufactured by the General Electric Company produce "black light" having a wave length of approximately 3600 Angstroms). After exposure to light for one hour the sheet was stiff and the polymerizable content thereof was substantially completely polymerized.

*Example V*

A sheet of cotton fabric was impregnated with the following liquid composition:

| | Parts |
|---|---|
| A copolymer of vinyl chloride and vinyl acetate containing 95% vinyl chloride | 100 |
| Polyethylene glycol 200 dimethacrylate | 100 |
| Acetone | 250 |

After evolution of the solvent, the substantially dry sheet was aproximately 0.040" in thickness. One sample of this sheet was sprayed with an acetone solution containing equal parts of lauroyl peroxide and cobalt nitrate hexahydrate so that 2% of lauroyl peroxide and 2% of cobalt nitrate hexahydrate, based on the weight of polyethylene glycol 200 dimethacrylate, were deposited onto the surface of the sheet upon evaporation of the acetone. A second acetone solution containing 5% of lauroyl peroxide was used to spray the other sample of the uncatalyzed sheet, and 2% of lauroyl peroxide was deposited thereon.

The two samples of surface catalyzed sheeting were then placed in an air oven maintained at 80° C. After 15 minutes the sheet catalyzed with the combination of lauroyl peroxide and cobalt nitrate hexahydrate was substantially completely cured, but one hour was required to cure the sheet catalyzed with lauroyl peroxide alone. Another sample of the sheeting catalyzed with the combination was found to be completely cured after one hour at room temperature whereas a period of two months was required to cure a sheet catalyzed with lauroyl peroxide alone under the same conditions.

*Example VI*

A monomer/polymer dough was prepared by thoroughly mixing the following ingredients:

| | Parts |
|---|---|
| Methyl methacrylate monomer | 50 |
| Polymethyl methacrylate | 50 |

The monomer/polymer dough was compressed into a sheet ⅛" in thickness. An acetone solution containing 5% of benzoyl peroxide was sprayed onto a sheet of kraft wrapping paper and after evolution of the solvent therefrom, the paper was placed adjacent the monomer/polymer sheet. Approximately ½% of catalyst, based upon the weight of monomeric methyl methacrylate in the sheet, contacted one surface of the monomer/polymer sheet. The sheet was then enclosed in cellophane and placed in an air oven at 80° C. After one hour the monomer/polymer sheet was stiff and substantially completely cured throughout the entire thickness thereof.

It will be understood that the above examples are merely illustrative and that the invention broadly comprises bringing into intimate contact with the surface only of a substantially dry sheet comprising a polymerizable ethylenically unsaturated organic compound, a solid polymerization catalyst and subjecting said sheet to polymerization conditions. Any convenient method for bringing the catalyst into intimate contact with the surface of the sheet may be used including dusting the solid catalyst on or brushing or spraying on the surface a solution of the catalyst in a volatile organic solvent and then removing the solvent to deposit the catalyst. Also, the catalyst may be applied by any of the foregoing methods to the surface of some other material and then bringing that surface intimately in contact with the surface of the body to be polymerized.

The thickness of the sheet to be treated according to this invention is not limited although practical considerations clearly will have some limiting effect. Factors bearings on this include the time of cure, the temperature or, if actinic energy is to be used, the intensity of the actinic energy and transparency of the body, and the specific catalyst and concentration thereof on the surface of the sheet. Obviously, the curing of sheets of great thickness by the instant invention will require a greater time for complete curing than relatively thin sections.

It will be apparent to anyone skilled in the art that this invention is of broad and general application. Any type of solid polymerization catalyst known to accelerate addition polymerization, may be used and the catalyst may be of the type which is activated by actinic energy or the type activated by thermal energy.

While the invention is in no way limited to any specific polymerization catalyst, either thermal or photopolymerization type, the commonly used thermal polymerization catalysts well adapted for use in the invention include benzoyl peroxide, lauroyl peroxide, acetyl benzoyl peroxide, diacetyl peroxide, tertiary butyl perbenzoate, and p-chloro benzoyl peroxide. Suitable photopolymerization catalysts include benzoin and similar acyloin compounds and various vicinal ketaldonyl compounds as disclosed in Agre U. S. Patents 2,367,660 and 2,367,661. Another class of polymerization catalysts which can be used very advantageously, comprise the various inorganic cobalt salts such as cobalt nitrate and cobalt chloride as described in Marks U. S. Patent 2,516,064. It is also feasible to use combinations of the above catalysts. These cobalt salts are usually employed in combination with another catalyst.

The proportion of catalyst will be related to the polymerizable component of the body in question. The catalytic effect of any given catalyst with respect to any given polymerizable component will not be influenced by the procedure of this invention. That is, a catalyst particularly effective in accelerating polymerization of a certain polymerizable compound in heretofore known polymerization procedures will likewise be particularly effective when used in the instant process. Numerous illustrations have been given in the examples of the effect of various catalysts in different proportions. The concentration of catalysts will obviously be varied to suit varying circumstances although, in general, the catalyst applied to the surface of a body will be in the range of 0.5% to 15% by weight of the polymerizable component in the body.

The invention is applicable to the treatment of a sheet containing any liquid, polymerizable ethylenically unsaturated organic compound which takes part in addition polymerization as contrasted to condensation polymerization. These polymerizable compounds are well known in the art and it would serve no purpose to attempt to list them all. The more prominent ones include the amides, esters and nitriles of acrylic, chloroacrylic and alkacrylic acids such as methacryl amide, methyl acrylate, methyl chloroacrylate, methyl methacrylate, ethyl methacrylate, butyl methacrylate, ethoxy ethyl methacrylate, glycol dimethacrylate, methyl ethacrylate, ethyl ethacrylate, acrylonitrile, methacrylonitrile; other vinyl and vinylidene compounds as vinyl acetate, vinyl chloride, vinylidene chloride, vinyl ethers, styrene, methyl styrene, allyl chloride and dimethyl itaconate. Also included are the vinyl and allyl esters of polybasic acids such as succinic, adipic, and phthalic acids. It will be observed that these polymerizable compounds are not limited to those containing a single ethylenically unsaturated linkage in the molecule but also include polymerizable compounds containing two or more such linkages.

Non-polymerizable components which can be incorporated with the above mentioned liquid polymerizable compounds, include linear polymers or various inert inorganic filler materials or combinations of both. These components are employed in such proportions so as to form a substantially dry mass which can be readily shaped by conventional means into sheets. Suitable linear polymers include the derivatives of acrylic and substituted acrylic acids such as methacrylic or chloroacrylic acids, among such derivatives being polymethyl methacrylate, polymethyl and polyethyl acrylates, polybutyl methacrylate, and polymethyl chloroacrylate; the various aryl polymers, i. e., polystyrene, polymethylstyrene; the various polyvinyl esters, i. e., polyvinyl acetate, polyvinyl butyrate, polyvinyl acetate-butyrate; polyvinyl acetals, i. e., polyvinyl formal, polyvinyl butyral; halogen containing polymers, i. e., vinyl chloride and chlorinated polyethylene; cellulose acetate, cellulose nitrate and ethyl cellulose; and polyvinyl ethers, i. e., polyvinyl methyl ether and polyvinyl isobutyl ether. In addition, various copolymers may be used in the invention as, for example, copolymers of vinyl chloride/diethyl fumarate, vinyl chloride/diethyl maleate, styrene/maleic anhydride, styrene/methyl methacrylate, vinyl chloride/vinyl acetate, vinyl chloride/vinylidene chloride, vinyl acetate/methyl methacrylate, methyl methacrylate/diolefins such as methyl methacrylate/butadiene.

Various inert, inorganic filler materials may also be incorporated with the polymerizable liquid compounds, the presence of a linear polymer not being necessary provided that the resulting reactive composition is a substantially dry mass. Suitable filler materials include calcium carbonate, asbestos fibers, silica, various talcs, types of clays such as bentonite clay, wood flour, gypsum, zinc oxide, saw dust, fused alumina, emery, and other types of fillers as would be advantageous for a specific application.

The invention is particularly applicable to sheets formed by impregnating a fibrous base with a polymerizable compound of the type herein disclosed. Commonly used fibrous materials for such fibrous bases include glass fiber, cotton duck, absorbent paper, felt, woven or knitted fabrics of cotton, rayon, wool, nylon, glass fibers and the like, or matted fibers of cotton, wool, glass or mixtures thereof. The specific manner of impregnating these fibrous bases is well known in the art and forms no part of this invention. Where a volatile organic solvent is used in the impregnating, it should be removed to give a substantially dry surface before applying catalyst thereto.

Depending upon the type of polymerization catalyst employed, thermal or actinic energy or a combination of both may be used to cure the sheet containing the polymerizable component. Under certain conditions, when it is desired to harden only one surface or selected portions of a surface or to produce case-hardened sheets, one or the other method of curing or combinations of the two may prove most advantageous. For example, selected portions of a surface may be catalyzed with a photopolymerization catalyst and then subjected to actinic energy. After complete curing, the uncatalyzed portions will remain soft. Further, different amounts of either a thermal or photopolymerization catalyst may be applied to a surface or an inhibitor may be applied to selected areas of a surface to have various portions possessing a greater degree of hardness or stiffness than adjacent portions.

In preparing solutions of the polymerization catalyst for use in this invention, the selection of the volatile organic solvent will depend upon the solubility characteristics of the catalyst and selection of an appropriate one will present no problem to the art. Acetone is suitable in practically all cases but other readily available solvents adapted for the purpose include esters such as methyl acetate, and halogen-containing solvents such as chloroform.

The present invention may be used to advantage wherever sheets of the type hereinbefore described are used. For example, shoe stiffener blanks for box toes and counters may be stiffened by applying catalyst to the surfaces thereof or to the adjacent lining or doubler. Selected portions of such shoe stiffener blanks may be rendered soft by omitting catalyst or adding an inhibitor in certain selected areas thereof such as the soft rib of a box toe which is stitched to the soles of a shoe for securing the box toe in place. Case hardened sheets may readily be prepared by surface application of catalyst followed by short curing cycles insufficient in time to allow complete polymerization throughout the entire volume of the body. The incorporation of an inhibitor within a polymerizable body also serves as a method of producing case-hardened bodies. Catalysts may be added to various types of cements including liquid polymerizable compounds, such as cements being applied to the surface of several layers of sheets containing a polymerizable component and which sheets are to be bonded together.

An advantage of the present invention is that it provides a highly practical method for adding polymerization catalysts to sheets comprising a liquid polymerizable component. A further advantage is that the invention provides for increasing the storage life of such sheets before curing as well as avoiding the necessity of taking special and costly precautions in storing. A still further advantage is that the invention provides a way of curing selected portions of sheets and the like.

As many apparently widely different embodiments of this invention may be made without departing from the spirit and scope thereof, it is to be understood that the invention is not limited to the specific embodiments thereof except as defined in the appended claims.

The invention claimed is:

1. The process which comprises (1) forming a sheet material which is free of liquid on its surface and which has evenly distributed throughout the interior of said sheet material a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts, (3) subjecting the resultant catalyst-treated sheet material to the action of radiant energy capable of polymerizing substantially all of said liquid organic compound to a solid form, and (4) recovering said sheet material in a stiffened form.

2. The process of claim 1 in which said catalyst is a thermal polymerization catalyst.

3. The process of claim 1 in which said catalyst is a photopolymerization catalyst.

4. The process which comprises (1) forming a sheet material which is free of liquid on its surface and which has evenly distributed throughout the interior of said sheet material a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts by brushing said surface with a solution of said catalyst in a volatile organic solvent followed by removing said solvent, (3) subjecting the resultant catalyst-treated sheet material to the action of radiant energy capable of polymerizing substantially all of said liquid organic compound to a solid form, and (4) recovering said sheet material in a stiffened form.

5. The process which comprises (1) forming a sheet material which is free of liquid on its surface and which has evenly distributed throughout the interior of said sheet material a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts by dusting said surface with said catalyst in a finely-divided form, (3) subjecting the resultant catalyst-treated sheet material to the action of radiant energy capable of polymerizing substantially all of said liquid organic compound to a solid form, and (4) recovering said sheet material in a stiffened form.

6. The process which comprises (1) impregnating a fibrous substrate to form a sheet material which is free of liquid on its surface and which has evenly distributed throughout the interior of said sheet material a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts, (3) subjecting the resultant catalyst-treated sheet material to the action of radiant energy capable of polymerizing substantially all of said liquid organic compound to a solid form, and (4) recovering said sheet material in a stiffened form.

7. The process which comprises (1) impregnating a fibrous substrate to form a sheet material which is free of liquid on its surface and which has evenly distributed throughout the interior of said sheet material a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts by brushing said surface with a solution of said catalyst in a volatile organic solvent followed by removing said solvent, (3) subjecting the resultant catalyst-treated sheet material to the action of radiant energy capable of polymerizing substantially all of said liquid organic compound to a solid form, and (4) recovering said sheet material in a stiffened form.

8. The process which comprises (1) impregnating a fibrous substrate to form a sheet material which is free of liquid on its surface and which has evenly distributed throughout the interior of said sheet material a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts by dusting said surface with said catalyst in a finely-divided form, (3) subjecting the resultant catalyst-treated sheet material to the action of radiant energy capable of polymerizing substantially all of said liquid organic compound to a solid form, and (4) recovering said sheet material in a stiffened form.

9. The process which comprises (1) forming a sheet material which is free of liquid on its surface and which consists essentially of a blend of (a) a solid synthetic linear polymer obtained by polymerization of an ethylenically unsaturated organic compound and (b) a liquid, ethylenically unsaturated, organic compound capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts, (3) subjecting the resultant catalyst-treated sheet material to the action of radiant energy capable of polymerizing substantially all of said liquid organic compound to a solid form, and (4) recovering said sheet material in a stiffened form.

10. The process which comprises (1) forming a sheet material which is free of liquid on its surface and which consists essentially of a blend of (a) a solid synthetic linear polymer obtained by polymerization of an ethylenically unsaturated organic compound and (b) a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts by brushing said surface with a solution of said catalyst in a volatile organic solvent followed by removing said solvent, (3) subjecting the resultant catalyst-treated sheet material to the action of radiant energy capable of polymerizing substantially all of said liquid organic compound to a solid form, and (4) recovering said sheet material in a stiffened form.

11. The process which comprises (1) forming a sheet material which is free of liquid on its surface and which consists essentially of a blend of (a) a solid synthetic linear polymer obtained by polymerization of an ethylenically unsaturated organic compound and (b) a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts by dusting said surface with said catalyst in a finely-divided form, (3) subjecting the resultant catalyst-treated sheet material to the action of radiant energy capable of polymerizing substantially all of said liquid organic compound to a solid form, and (4) recovering said sheet material in a stiffened form.

12. The process which comprises impregnating a fibrous substrate to form a sheet material which is free of liquid on its surface and which consists essentially of a blend of (a) a solid synthetic linear polymer obtained by polymerization of an ethylenically unsaturated organic compound and (b) a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts, (3) subjecting the resultant catalyst-treated sheet material to the action of radiant energy capable of polymerizing substantially all of said liquid organic compound to a solid form, and (4) recovering said sheet material in a stiffened form.

13. The process which comprises impregnating a fibrous substrate to form a sheet material which is free of liquid on its surface and which consists essentially of a blend of (a) a solid synthetic linear polymer obtained by polymerization of an ethylenically unsaturated organic compound and (b) a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts by brushing said surface with a solution of said catalyst in a volatile organic solvent followed by removing said solvent, (3) subjecting the resultant catalyst-treated sheet material to the action of radiant energy capable of polymerizing substantially all of said liquid organic compound to a solid form, and (4) recovering said sheet material in a stiffened form.

14. The process which comprises impregnating a fibrous substrate to form a sheet material which is free of liquid on its surface and which consists essentially of a blend of (a) a solid synthetic linear polymer obtained by polymerization of an ethylenically unsaturated organic compound and (b) a liquid, ethylenically unsaturated, organic compound, capable of being polymerized under the hereinafter specified conditions of polymerization, and being free of polymerization catalyst, (2) applying to the surface only of said sheet material a dry layer of solid catalyst from the group consisting of thermal polymerization catalysts and photopolymerization catalysts by dusting said surface with said catalyst in a finely-divided form, (3) subjecting the resultant catalyst-treated sheet material to the action of radiant energy capable of polymerizing substantially all of said liquid organic compound to a solid form, and (4) recovering said sheet material in a stiffened form.

References Cited in the file of this patent

UNITED STATES PATENTS

| Number | Name | Date |
|---|---|---|
| 2,270,285 | Frolich | Jan. 20, 1942 |
| 2,332,461 | Muskat et al. | Oct. 19, 1943 |
| 2,370,562 | Meunier | Feb. 27, 1945 |
| 2,431,315 | Drummond | Nov. 25, 1947 |
| 2,495,137 | Rowland | Jan. 17, 1950 |

OTHER REFERENCES

Marchionna's "Butalastic Polymers," Reinhold Publishing Co., New York (1946).